(12) United States Patent
Gagiev et al.

(10) Patent No.: US 10,944,614 B2
(45) Date of Patent: Mar. 9, 2021

(54) GUARD INTERVALS FOR WIRELESS NETWORKS

(71) Applicant: Intel Corporation, Santa Clara, CA (US)

(72) Inventors: Yaroslav P. Gagiev, Nizhny Novgorod (RU); Artyom Lomayev, Nizhny Novgorod (RU); Alexander Maltsev, Nizhny Novgorod (RU); Michael Genossar, Modiin (IL); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/593,192

(22) Filed: Oct. 4, 2019

(65) Prior Publication Data

US 2020/0112468 A1 Apr. 9, 2020

Related U.S. Application Data

(63) Continuation of application No. 15/474,972, filed on Mar. 30, 2017, now Pat. No. 10,461,983.

(60) Provisional application No. 62/379,570, filed on Aug. 25, 2016.

(51) Int. Cl.
| | |
|---|---|
| *H04W 4/00* | (2018.01) |
| *H04L 27/26* | (2006.01) |
| *H04B 7/0413* | (2017.01) |
| *H04J 13/00* | (2011.01) |
| *H04L 23/00* | (2006.01) |
| *H04L 12/28* | (2006.01) |
| *H04W 84/12* | (2009.01) |

(52) U.S. Cl.
CPC ....... *H04L 27/2666* (2013.01); *H04B 7/0413* (2013.01); *H04J 13/0014* (2013.01); *H04L 23/00* (2013.01); *H04L 27/2605* (2013.01); *H04L 27/2613* (2013.01); *H04L 12/2863* (2013.01); *H04L 27/2636* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 9,949,259 | B2 * | 4/2018 | Eitan | H04L 1/0084 |
| 10,021,695 | B2 * | 7/2018 | Eitan | H04B 7/0426 |
| 10,033,564 | B2 * | 7/2018 | Eitan | H04L 25/0202 |

(Continued)

*Primary Examiner* — Bob A Phunkulh
(74) *Attorney, Agent, or Firm* — Eversheds Sutherland (US) LLP

(57) ABSTRACT

This disclosure describes methods, apparatus, and systems to increase the transmission data rate in wireless networks, for example, by using one or more Multiple Input Multiple Output (MIMO) and/or channel bonding techniques. In one embodiment, the disclosure describes the use of Golay Sequence Sets (GSS) to define guard intervals (GIs) for single carrier (SC) single channel bonding and multiple input multiple output (MIMO) transmission. In various embodiments, the disclosure describes the design of guard interval sequence for 3 types of guard intervals having lengths that can be classified as short, medium, and long. In another embodiment, the disclosure defines the guard interval for single channel transmission channel bonding and for MIMO transmission.

20 Claims, 8 Drawing Sheets

(56) References Cited

U.S. PATENT DOCUMENTS

| | | | | |
|---|---|---|---|---|
| 10,079,709 B2* | 9/2018 | Sun | ............... | H04L 27/2692 |
| 2010/0061320 A1* | 3/2010 | Lakkis | ............... | H04L 27/2602 |
| | | | | 370/329 |
| 2010/0118835 A1* | 5/2010 | Lakkis | ............... | H04B 7/0695 |
| | | | | 370/336 |
| 2013/0223498 A1* | 8/2013 | Sanderovich | ....... | H04L 25/0224 |
| | | | | 375/225 |
| 2015/0280862 A1* | 10/2015 | Teplitsky | ............... | H04B 1/30 |
| | | | | 375/319 |
| 2016/0164800 A1* | 6/2016 | Eitan | ............... | H04L 5/14 |
| | | | | 370/389 |
| 2016/0309457 A1* | 10/2016 | Eitan | ............... | H04W 52/0203 |
| 2016/0330059 A1* | 11/2016 | Eitan | ............... | H04L 27/2647 |
| 2016/0330738 A1* | 11/2016 | Eitan | ............... | H04L 1/0084 |
| 2017/0033949 A1* | 2/2017 | Eitan | ............... | H04L 25/0232 |
| 2017/0033958 A1* | 2/2017 | Eitan | ............... | H04L 25/0202 |
| 2017/0048095 A1* | 2/2017 | Sun | ............... | H04L 27/2646 |
| 2017/0207830 A1* | 7/2017 | Lomayev | ............... | H04L 27/2605 |
| 2017/0257245 A1* | 9/2017 | Shinagawa | ......... | H04L 27/2656 |

\* cited by examiner

| Stream number 302 | $W_K$ vector for 32 sequence length | $W_K$ vector for 64 sequence length | $W_K$ vector for 128 sequence length | $W_K$ vector for 256 sequence length | $W_K$ vector for 512 sequence length |
|---|---|---|---|---|---|
| 1 | [-1,-1,-1,-1,+1] | [-1,-1,-1,-1,+1,-1] | [-1,-1,-1,-1,+1,-1,-1] | [-1,-1,-1,-1,+1,-1,-1,+1] | [-1,-1,-1,-1,+1,-1,-1,+1,+1] |
| 2 | [+1,-1,-1,-1,+1] | [+1,-1,-1,-1,+1,-1] | [+1,-1,-1,-1,+1,-1,-1] | [+1,-1,-1,-1,+1,-1,-1,+1] | [+1,-1,-1,-1,+1,-1,-1,+1,+1] |
| 3 | [-1,-1,-1,+1,-1] | [-1,-1,-1,+1,-1,-1] | [-1,-1,-1,+1,-1,-1,+1] | [-1, -1, -1,+1,-1,-1,+1,-1] | [-1, -1, -1,+1,-1,-1,+1,-1,+1] |
| 4 | [+1,-1,-1,+1,-1] | [+1,-1,-1,+1,-1,-1] | [+1,-1,-1,+1,-1,-1,+1] | [+1, -1, -1,+1,-1,-1,+1,-1] | [+1, -1, -1,+1,-1,-1,+1,-1,+1] |
| 5 | [-1,-1,-1,+1,-1] | [-1,-1,-1,+1,-1,+1] | [-1,-1,-1,+1,-1,+1,+1] | [-1,-1,-1,+1,-1,+1,+1,-1] | [-1,-1,-1,+1,-1,+1,+1,-1,+1] |
| 6 | [+1,-1,-1,+1,-1] | [+1,-1,-1,+1,-1,+1] | [+1,-1,-1,+1,-1,+1,+1] | [+1,-1,-1,+1,-1,+1,+1,-1] | [+1,-1,-1,+1,-1,+1,+1,-1,+1] |
| 7 | [-1,-1,-1,+1,+1] | [-1,-1,-1,+1,+1,+1] | [-1,-1,-1,+1,+1,+1,-1] | [-1,-1,-1,+1,+1,+1,-1,-1] | [-1,-1,-1,+1,+1,+1,-1,-1,+1] |
| 8 | [+1,-1,-1,+1,+1] | [+1,-1,-1,+1,+1,+1] | [+1,-1,-1,+1,+1,+1,-1] | [+1,-1,-1,+1,+1,+1,-1,-1] | [+1,-1,-1,+1,+1,+1,-1,-1,+1] |
| 9 | [-1,-1,+1,-1,-1] | [-1,-1,+1,-1,-1,+1] | [-1,-1,+1,-1,-1,+1,-1] | [-1,-1,+1,-1,-1,+1,-1,-1] | [-1,-1,+1,-1,-1,+1,-1,-1,+1] |
| 10 | [+1,-1,+1,-1,-1] | [+1,-1,+1,-1,-1,+1] | [+1,-1,+1,-1,-1,+1,-1] | [+1,-1,+1,-1,-1,+1,-1,-1] | [+1,-1,+1,-1,-1,+1,-1,-1,+1] |
| 11 | [-1,-1,+1,-1,+1] | [-1,-1,+1,-1,+1,-1] | [-1,-1,+1,-1,+1,-1,+1] | [-1,-1,+1,-1,+1,-1,+1,-1] | [-1,-1,+1,-1,+1,-1,+1,-1,+1] |
| 12 | [+1,-1,+1,-1,+1] | [+1,-1,+1,-1,+1,-1] | [+1,-1,+1,-1,+1,-1,+1] | [+1,-1,+1,-1,+1,-1,+1,-1] | [+1,-1,+1,-1,+1,-1,+1,-1,+1] |
| 13 | [-1,-1,+1,-1,+1] | [-1,-1,+1,-1,+1,+1] | [-1,-1,+1,-1,+1,+1,+1] | [-1,-1,+1,-1,+1,+1,+1,-1] | [-1,-1,+1,-1,+1,+1,+1,-1,+1] |
| 14 | [+1,-1,+1,-1,+1] | [+1,-1,+1,-1,+1,+1] | [+1,-1,+1,-1,+1,+1,+1] | [+1,-1,+1,-1,+1,+1,+1,-1] | [+1,-1,+1,-1,+1,+1,+1,-1,+1] |
| 15 | [-1,-1,+1,+1,-1] | [-1,-1,+1,+1,-1,+1] | [-1,-1,+1,+1,-1,+1,-1] | [-1,-1,+1,+1,-1,+1,-1,-1] | [-1,-1,+1,+1,-1,+1,-1,-1,+1] |
| 16 | [+1,-1,+1,+1,-1] | [+1,-1,+1,+1,-1,+1] | [+1,-1,+1,+1,-1,+1,-1] | [+1,-1,+1,+1,-1,+1,-1,-1] | [+1,-1,+1,+1,-1,+1,-1,-1,+1] |

FIG. 3

| Stream number | N = 32 | N = 64 | N = 128 | N = 256 | N = 512 |
|---|---|---|---|---|---|
| 1 | $Ga_{32}^{1}$ | $-Ga_{64}^{1}$ | $Ga_{128}^{1}$ | $Ga_{256}^{1}$ | $Ga_{512}^{1}$ |
| 2 | $Ga_{32}^{2}$ | $-Ga_{64}^{2}$ | $Ga_{128}^{2}$ | $Ga_{256}^{2}$ | $Ga_{512}^{2}$ |
| 3 | $Ga_{32}^{3}$ | $-Ga_{64}^{3}$ | $-Ga_{128}^{3}$ | $Ga_{256}^{3}$ | $Ga_{512}^{3}$ |
| 4 | $Ga_{32}^{4}$ | $-Ga_{64}^{4}$ | $-Ga_{128}^{4}$ | $Ga_{256}^{4}$ | $Ga_{512}^{4}$ |
| 5 | $-Ga_{32}^{5}$ | $-Ga_{64}^{5}$ | $-Ga_{128}^{5}$ | $Ga_{256}^{5}$ | $Ga_{512}^{5}$ |
| 6 | $-Ga_{32}^{6}$ | $-Ga_{64}^{6}$ | $-Ga_{128}^{6}$ | $Ga_{256}^{6}$ | $Ga_{512}^{6}$ |
| 7 | $Ga_{32}^{7}$ | $Ga_{64}^{7}$ | $-Ga_{128}^{7}$ | $Ga_{256}^{7}$ | $Ga_{512}^{7}$ |
| 8 | $Ga_{32}^{8}$ | $Ga_{64}^{8}$ | $-Ga_{128}^{8}$ | $Ga_{256}^{8}$ | $Ga_{512}^{8}$ |
| 9 | $Ga_{32}^{9}$ | $Ga_{64}^{9}$ | $-Ga_{128}^{9}$ | $Ga_{256}^{9}$ | $Ga_{512}^{9}$ |
| 10 | $Ga_{32}^{10}$ | $Ga_{64}^{10}$ | $-Ga_{128}^{10}$ | $Ga_{256}^{10}$ | $Ga_{512}^{10}$ |
| 11 | $Ga_{32}^{11}$ | $-Ga_{64}^{11}$ | $-Ga_{128}^{11}$ | $Ga_{256}^{11}$ | $Ga_{512}^{11}$ |
| 12 | $Ga_{32}^{12}$ | $-Ga_{64}^{12}$ | $-Ga_{128}^{12}$ | $Ga_{256}^{12}$ | $Ga_{512}^{12}$ |
| 13 | $-Ga_{32}^{13}$ | $-Ga_{64}^{13}$ | $-Ga_{128}^{13}$ | $Ga_{256}^{13}$ | $Ga_{512}^{13}$ |
| 14 | $-Ga_{32}^{14}$ | $-Ga_{64}^{14}$ | $-Ga_{128}^{14}$ | $Ga_{256}^{14}$ | $Ga_{512}^{14}$ |
| 15 | $Ga_{32}^{15}$ | $Ga_{64}^{15}$ | $-Ga_{128}^{15}$ | $Ga_{256}^{15}$ | $Ga_{512}^{15}$ |
| 16 | $Ga_{32}^{16}$ | $Ga_{64}^{16}$ | $-Ga_{128}^{16}$ | $Ga_{256}^{16}$ | $Ga_{512}^{16}$ |

FIG. 4

GUARD INTERVALS FOR WIRELESS NETWORKS

CROSS-REFERENCE TO RELATED APPLICATION

This application is a continuation of U.S. Non-provisional application Ser. No. 15/474,972, filed Mar. 30, 2017, which claims the benefit of U.S. Provisional Patent Application No. 62/379,570, filed on Aug. 25, 2016, the disclosure of which is incorporated herein by reference in its entirety.

TECHNICAL FIELD

This disclosure generally relates to systems and methods for wireless communications and, more particularly, systems and methods to guard intervals for wireless communication.

BACKGROUND

Various standards, for example, Institute of Electrical and Electronics Engineers (IEEE) 802.11ay, are being developed for the millimeter (mm) wave (for example, 60 GHz) frequency band of the spectrum. For example, IEEE 802.11ay is one such standard. IEEE 802.11ay is related to the IEEE 802.11ad standard, also known as WiGig. IEEE 802.11ay seeks, in part, to increase the transmission data rate between two or more devices in a network, for example, by implementing Multiple Input Multiple Output (MIMO) techniques.

BRIEF DESCRIPTION OF THE DRAWINGS

FIG. 3 shows an example table that represents Wk vector value to generate Golay sequences of different lengths for Multiple-input and multiple-output (MIMO) applications, in accordance with example embodiments of the disclosure.

FIG. 4 shows an example table that represents Guard intervals (GIs), $GI^i_N$, for different streams number i=1:16 and length N, in accordance with example embodiments of the disclosure.

DETAILED DESCRIPTION

Figure 1:
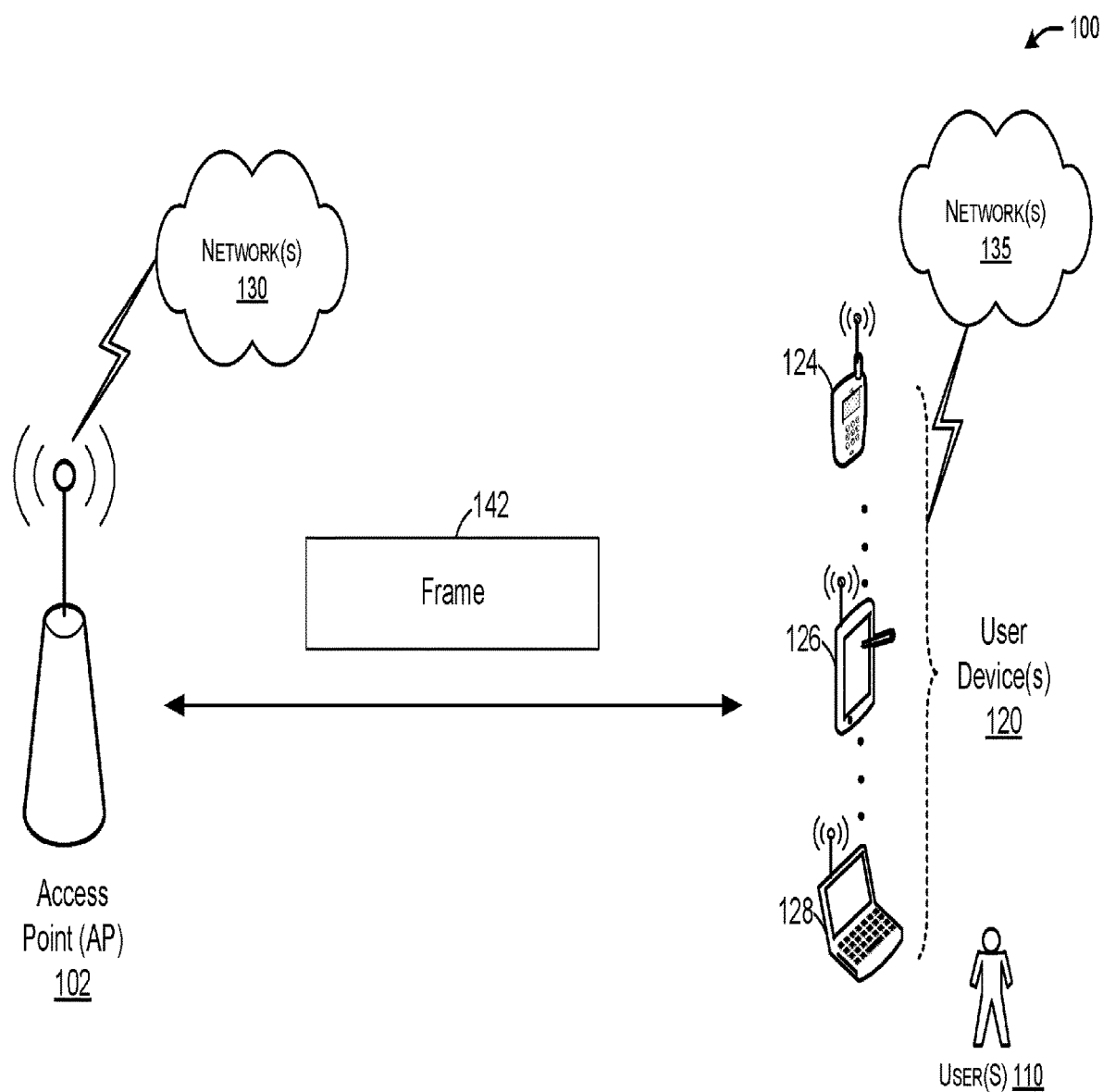
FIG. 1 shows an exemplary network environment in accordance with the systems and methods disclosed herein.

Example embodiments described herein provide certain systems, methods, and devices, for providing signaling information to Wi-Fi devices in various Wi-Fi networks, in accordance with IEEE 802.11 communication standards, including but not limited to IEEE 802.11 ay.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Various standards, for example, Institute of Electrical and Electronics Engineers (IEEE) 802.1 lay, are being developed for the millimeter (mm) wave (for example, 60 GHz) frequency band of the spectrum. For example, IEEE 802.1 lay is one such standard. IEEE 802.11ay is related to the IEEE 802.11ad standard, also known as WiGig. IEEE 802.11ay seeks, in part, to increase the transmission data rate between two or more devices in a network, for example, by implementing Multiple Input Multiple Output (MIMO) techniques.

In wireless networks, signals can be sent and received between transmitters and receivers through one or more channels. Such channels can induce distortions in the signal transmitted and received. To reduce the effects of the distortions and maintain signal integrity, the characteristics of the one or more channels, at a given time, can be determined to estimate the induced distortion to the signals transmitted and received by the channels, that is, performing channel estimation.

One technique for performing channel estimation in wireless systems can include transmitting, by a transmitter, signals with predetermined sequences and comparing the signals received in a receiver. For example, auto-correlation and/or cross-correlation can be performed on the received with predetermined sequences to estimate the channel characteristics. Since the sequences of the transmitted signals are known to the receiver, the results of the correlation operation can yield the estimation of the channel characteristics, for example, the impulse response of the channel.

For efficient channel estimation, sequences with predetermined autocorrelation properties, such as complementary sequences (for example, Golay complementary sequences), can be transmitted by the transmitter and auto-correlated by the receiver, for example, in one or more channel estimation fields (CEF) of data packets that contain the transmitted signal. In one embodiment, Golay complementary sequences can refer to sequences of bipolar symbols (±1) that can be mathematically constructed to have specific autocorrelation properties. In particular, one property of Golay complementary sequences is that they can have a sum of autocorrelations that equals a delta function, which can be defined, in part as a function on the real number line that is zero everywhere except at zero, with an integral of one over the entire real line.

In one embodiment, channel state information (CSI) can refer to known channel properties of a communication link. This information can describe how a signal propagates from the transmitter to the receiver and represents the combined effect of, for example, scattering, fading, and power decay with distance. The CSI can make it possible to adapt transmissions to current channel conditions, which can be important for achieving reliable communication with high data rates in multi-antenna systems. In various embodiments, this disclosure describes GIs that can be used in connection with Golay sequences and Golay Sequence Sets (GSSs) for channel estimation and extracting of CSI.

In various embodiments, the disclosed GSSs can include a number of Golay complementary pairs (for example, Ga and Gb). In one embodiment, the disclosed Golay complementary pairs can meet various predetermined rules and can be used to define enhanced directional multi-gigabit (EDMG) STF and CEF fields for multiple-input and multiple-output (MIMO) transmission.

In one embodiment, is a method for multiplying the capacity of a radio link using multiple transmit and receive antennas to exploit multipath propagation. In one embodiment, MIMO can include various subtypes, including, for example: multiple-input and single-output (MISO), which can refer to a special case when the receiver has a single antenna; single-input and multiple-output (SIMO), which can refer to a special case when the transmitter has a single antenna; and single-input single-output (SISO) which can refer to a conventional radio system where neither transmitter nor receiver has multiple antennas. In one embodiment, the disclosure can be used in connection with, but is not limited to, all of the above mentioned forms of MIMO.

In various embodiments, a GSS generation system may produce complementary sequences of an arbitrary length. In one embodiment, a GSS for a sequence can be defined in terms of delay vector and/or a weight vector. Further, in another embodiment, the delay vector and/or a weight vector can be described in accordance with one or more standards, for example, in accordance with IEEE 802.11ad standards. The Ga and Gb sequences can be generated using these vectors, for example, by using Golay generator structures. Furthermore, the delay vector and the weight vector can be based at least in part on the (Ga, Gb) complementary pair.

In one embodiment, the guard interval can be defined as a $Ga_{64}$ Golay sequence of length 64 symbols for single input and single Output (SISO) transmission, while further extending the Golay sequences to cover both the channel bonding and MIMO transmission. For MIMO transmission, more than one Golay sequence $Ga_N$ of length N may be needed, that is, a set of Golay sequences, $Ga^i_N$, $i=1:N_{STS}$, may be needed, where $N_{STS}$ can define the total number of space-time streams.

In one embodiment, data blocking and guard intervals can be used to divide modulation symbols into groups, for example, groups of 448 symbols interspersed with 64 symbol Golay sequence guard intervals. These 64 symbol Golay sequence guard intervals can provide a receiving device with a periodic pilot reference signal, for example, to assist with gain and phase tracking. The 64 symbol guard interval can be a $Ga_{64}$ Golay sequence and its periodic occurrence can be confirmed, for example, by examining an output of a $Ga_{64}$ correlator implemented at the receiving device. In one embodiment, the modulation can be conventional single-carrier modulation which is $\pi/2$ rotated, for example, to minimize the peak to average power ratio (PAPR) of the Binary phase-shift keying (BPSK) modulation (the GI's can be BPSK modulated) and, for example, to allow equivalent Gaussian Minimum Shift Keying (GMSK) modulation.

In various embodiments, the disclosure describes the design of guard interval sequence for 3 types of guard intervals having lengths that can be classified as short, medium, and long. In another embodiment, the disclosure defines the guard interval for single channel transmission channel bonding (for example, channel bonding×2, and channel bonding×4), and for MIMO transmission. In one embodiment, the disclosure can be used in connection with single carrier (SC) PHY for use in connection with one or more standards, for example, in connection with IEEE 802.11ay. In another embodiment, the disclosed systems and methods can be used in connection with directional antennas, for example, phase antenna arrays (PAAs).

As mentioned, in various embodiments, the disclosure describes the design of guard interval sequence for 3 types of guard intervals having lengths that can be classified as short, medium, and long. In another embodiment, the short guard interval can be used for short range applications, for example, when the channel impulse of a communication channel response associated with the network has a short duration, such as indoor environments. In one embodiment, the short guard interval can reduce overhead associated with the transmission of the guard interval and can increase the resulting data rate. In one embodiment, the long guard interval can be used in connection with application in large scale environments, for example, applications where a communications channel profile associated with the network has a long time delay spread, such as outdoor environments. In various embodiments, the long guard interval can allow for the reduction of inter symbol interference (ISI) on the network and/or communication channel(s). In one embodiment, ISI can refer to a form of distortion of a signal in which one symbol interferes with subsequent symbols. In one embodiment, ISI can be caused by multipath propagation or the inherent non-linear frequency response of a channel causing successive symbols to "blur" together. In one embodiment by mitigating the effects of ISI, data can be transmitted by a transmitting device to a receiving device over a network with a reduced error rate. In one embodiment, for single channel transmission, the following guard interval lengths can be used: short: N=32 symbols; normal: N=64 symbols; and long: N=128 symbols.

Example embodiments of the present disclosure relate to systems, methods, and devices for transmitting device can include a Golay generator that can generate Golay complementary sequences (Ga, Gb) which are can be modulated and transmitted, for example, using a modulator. The modulator may be, for example, an Orthogonal Frequency Division Multiplexing (OFDM) modulator, a single carrier (SC) modulator, and the like. In one embodiment, a Golay generator can generate the complementary sequences.

The signals including the Golay sequences can be received at a receiving device. Because of the channel conditions, the received Golay sequences Ga', Gb' may be different than the original Golay sequences Ga, Gb. However, a Golay correlator can correlate the received sequences. The received signal S' (including sequences Ga',Gb') can be filtered using a filter. Then, the cross-correlation results can indicate the channel estimation as provided by the Golay correlator. Further, in various embodiments, an equalizer can equalizes the received signals S' based on the output of the Golay correlator. The equalized signals can be de-modulated using a demodulator to obtain an estimate of the originally transmitted signal.

In one embodiment, a wireless network used in connection with the systems and methods of this disclosure may also include one or more legacy devices. Legacy devices can include those devices compliant with an earlier version of a given standard, but can reside in the same network as devices compliant with a later version of the standard. In one embodiment, disclosed herein are systems, methods, and devices that can permit legacy devices to communicate with and perform channel estimation with newer version devices. Thus, newer devices or components using current standards can have backward compatibility with legacy devices within a network. These devices and components can be adaptable to legacy standards and current standards when transmitting information within the network. For example, backward compatibility with legacy devices may be enabled at either a physical (PHY) layer or a Media-Specific Access Control (MAC) layer. At the PHY layer, backward compatibility can be achieved, for example, by re-using the PHY preamble from a previous standard. Legacy devices may decode the preamble portion of the signals, which may provide sufficient information for determining the channel estimation or other relevant information for the transmission and reception of the signals. At the MAC layer, backward compatibility with legacy devices may be enabled by having devices that are compliant with a newer version of the standard transmit additional frames using modes or data rates that are employed by legacy devices.

Various legacy standards can use Golay complementary sequences (which can be denoted as Ga and Gb) to define short training fields (STFs) and channel estimation fields (CEFs) associated with a preamble of a data packet. For example, the STF field can have multiple uses in wireless networks, including, but not limited to, packet detection, carrier frequency offset estimation, noise power estimation, synchronization, automatic gain control (AGC) setup and other possible signal estimations. As another example, the CEF can be used for the channel estimation in the time or the frequency domain. In the time domain, a Golay correlator can be used to perform matched filter operations without requiring the implementation of multipliers.

In various embodiments, the disclosure describes the use of Golay sequence sets (GSS) to define guard intervals (GIs) for single carrier (SC) single channel bonding and MIMO transmission, for example, in accordance with one or more standards (for example, IEEE 802.11ay).

FIG. 1 is a network diagram illustrating an example network environment, according to some example embodiments of the present disclosure. Wireless network 100 may include one or more devices 120 and one or more access point(s) (AP) 102, which may communicate in accordance with IEEE 802.11 communication standards, including IEEE 802.11ay. The device(s) 120 may be mobile devices that are non-stationary and do not have fixed locations.

The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth. In some embodiments, the user devices 120 and AP 102 may include one or more computer systems similar to that of the functional diagram of FIG. 7 and/or the example machine/system of FIG. 8, to be discussed further.

Returning to FIG. 1, any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

MIMO beamforming in a wireless network may be accomplished using RF beamforming and/or digital beamforming. In some embodiments, in performing a given MIMO transmission, user devices 120 (e.g., user devices 124, 126, 128), and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AP (e.g., AP 102) establishes communication with one or more user devices 120 (e.g., user devices 124, 126, and/or 128), the AP may communicate in the downlink direction by sending data frames (e.g., 142). The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices).

In various embodiments, the disclosed systems and methods can be used in connection with the mmWave (60 GHz) band, which may be related to the IEEE 802.11ad standard also known as WiGig. IEEE 802.11ay may be used to increase the transmission data rate in wireless networks, for example, by using one or more Multiple Input Multiple Output (MIMO) and/or channel bonding techniques. In one embodiment, channel bonding can refer to a networking arrangement in two or more channels are combined for redundancy or increased throughput. For example, neighboring 20 MHz channels can be bonded together to form a larger channel. By doubling the channel width, the data capacity of the transmission can be approximately doubled.

In one embodiment, the disclosure describes the use of Golay sequence sets (GSS) to define guard intervals (GIs) for single carrier (SC) single channel bonding and multiple input multiple output (MIMO) transmission, for example, in accordance with one or more standards (for example, IEEE 802.11ay). In one embodiment, the guard interval can be defined as a $Ga_{64}$ Golay sequence of length 64 symbols for single input and single Output (SISO) transmission, while further extending the Golay sequences to cover both the channel bonding and MIMO transmission. For MIMO transmission, more than one Golay sequence $Ga_N$ of length N may be needed, that is, a set of Golay sequences, $Ga^i_N$, $i=1:N_{STS}$, may be needed, where $N_{STS}$ can define the total number of space-time streams.

In various embodiments, the disclosure describes the design of guard interval sequence for 3 types of guard intervals having lengths that can be classified as short, medium, and long. In another embodiment, the disclosure defines the guard interval for single channel transmission channel bonding (for example, channel bonding×2, and channel bonding×4), and for MIMO transmission. In one embodiment, the disclosure can be used in connection with single carrier (SC) PHY for use in connection with one or more standards, for example, in connection with IEEE 802.11ay. In another embodiment, the disclosed systems and methods can be used in connection with directional antennas, for example, phase antenna arrays (PAAs).

As mentioned, in various embodiments, the disclosure describes the design of guard interval sequence for 3 types of guard intervals having lengths that can be classified as short, medium, and long. In another embodiment, the short guard interval can be used for short range applications, for example, when the channel impulse of a communication channel response associated with the network has a short duration. In one embodiment, the short guard interval can reduce overhead associated with the transmission of the guard interval and can increase the resulting data rate. In one embodiment, the long guard interval can be used in connection with application in large scale environments, for example, applications where a communications channel profile associated with the network has a long time delay spread. In various embodiments, the long guard interval can allow for the reduction of inter symbol interference (ISI) on the network and/or communication channel(s).

In one embodiment, for single channel transmission, the following guard interval lengths can be used: short: N=32 symbols; normal: N=64 symbols; and long: N=128 symbols.

Figure 2:
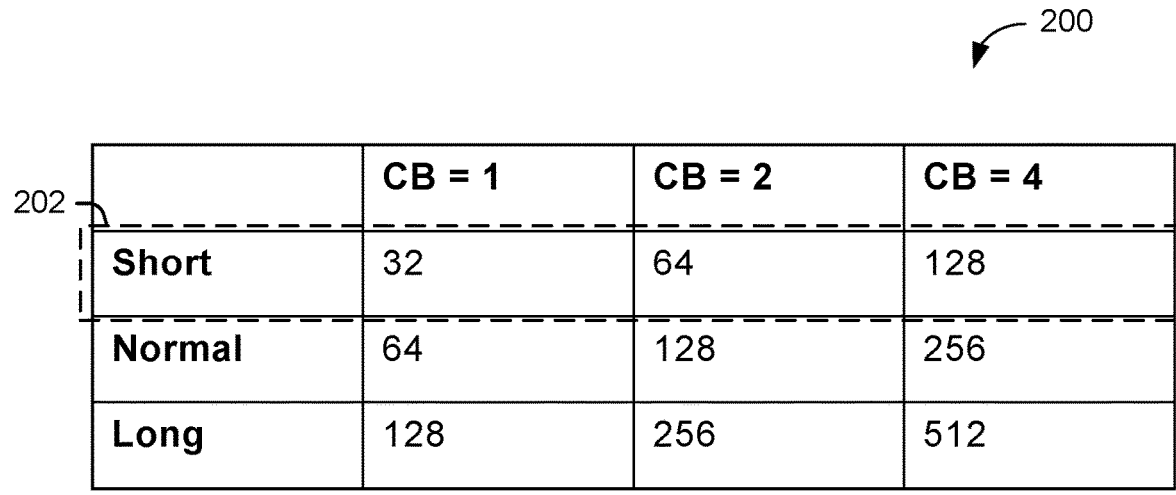
FIG. 2 shows an example table that represents Guard interval lengths for different channel bonding factors in accordance with example embodiments of the disclosure.

FIG. 2 shows an example table 200 that represents guard interval lengths for different channel bonding factors in accordance with example embodiments of the disclosure. For example, row 202 of table 200 indicates that for a short guard interval length (for example, for indoor environment transmission and reception of data over a network), for a channel bonding factor of 1, a guard interval of length 32 symbols can be used. Similarly, for a channel bonding factor of 2, a guard interval of length 64 symbols can be used. Further, for a channel bonding factor of 4, a guard interval of length 128 symbols can be used. The table of FIG. 2 contains other possible guard interval lengths based on different guard interval types and channel bonding (CB). For example, in order to support the mentioned guard interval types for CB=1, 2, 4, guard interval lengths of 32, 64, 128, 256, and 512 symbols may variously be used.

In one embodiment, the guard interval for the space-time streams can be defined as Ga Golay sequences. In various embodiments, for MIMO transmission, a Golay sequence set (GSS) may be required to define different sequences for different space-time streams. In one embodiment, a $Ga_N$ Golay sequence of length N can be modulated applying n/2 rotation by as follows:

$$Ga_N(n)*exp(j(\pi/2)*n), \text{ for } n=0:N-1 \qquad (eq. 1)$$

In various embodiments, the guard intervals can be defined using the following example delay vectors: for N=32: $D_k=[1,8,2,4,16]$; for N=64: $D_k=[1,8,2,4,16,32]$; for N=128: $D_k=[1,8,2,4,16,32,64]$; for N=256: $D_k=[1,8,2,4,16,32,64,128]$; and for N=512: $D_k=[1,8,2,4,16,32,64,128,256]$.

In one embodiment, the delay vector $D_k$ may be different for different length N and may be constant over the space-time streams. In another embodiment, the Golay sequences for different space-time streams may differ in the weight vectors $W_k$.

FIG. 3 shows an example table 300 that represents $W_k$ vector value to generate Golay sequences of different lengths for Multiple-input and multiple-output (MIMO) applications, in accordance with example embodiments of the disclosure. The table of FIG. 3 defines the weight vectors for different space-time streams up to 16 streams. In one embodiment, any subset of the weight vectors shown in the table of FIG. 3 can be used to set up a smaller number of streams. In one embodiment, one or more generation procedures can be used to generate Ga Golay sequence from the given delay and weight vectors, $D_k$ and $W_k$, respectively. For example, row 302 of table 300 indicates that for 1 stream, different Wk vectors can be used to generate the guard intervals along with a fixed delay vector Dk. In particular, for a sequence length of 32, the $W_k$ vector can be [−1, −1, −1, −1, +1]; for a sequence length of 64, the $W_k$ vector can be [−1, −1, −1, −1, +1, −1]; for a sequence length of 128, the $W_k$ vector can be [−1, −1, −1, −1, +1, −1, −1]; for a sequence length of 256, the $W_k$ vector can be [−1, −1, −1, −1, +1, −1, −1, +1]; and for a sequence length of 512, the $W_k$ vector can be [−1, −1, −1, −1, +1, −1,−1, +1, +1]. Further, as described above, In various embodiments, the delay vectors can include: for N=32: $D_k$=[1,8,2,4,16]; for N=64: $D_k$=[1,8,2,4,16,32]; for N=128: $D_k$=[1,8,2,4,16,32,64]; for N=256: $D_k$=[1,8,2,4,16,32,64,128]; and for N=512: $D_k$=[1,8,2,4,16,32,64,128,256].

In an example embodiment, for single user (SU) MIMO transmission, a predetermined number of streams, for example, 8 streams, may be used to generate the Ga Golay sequence. In such a case, the first predetermined number of streams, for example, the first 8 weight vectors in the table of FIG. 3, can be used to generate the Ga Golay sequence. In one embodiment, for multi-user (MU) MIMO transmission, the first predetermined number of streams, for example, the first 8 vectors (similar to SU-MIMO) may be used to generate the Ga Golay sequence. Alternatively or additionally, in another embodiment, for multi-user (MU) MIMO transmission, up to a predetermined number of streams, for example, 16 sequences can be used to generate the Ga Golay sequence. In this case the predetermined number of streams, for example, the 16 vectors in the table of FIG. 3 may be used to generate the Ga Golay sequence.

FIG. 4 shows an example table 400 that represents Guard intervals $GI^i_N$ for different streams numbers i=1:16 and length N, in accordance with example embodiments of the disclosure. In particular, the table of FIG. 4 defines the Guard Interval (GI) $GI^i_N$ for space-time stream with index "i" and length N. In one embodiment, the $GI^i_N$ can further have a sign, that is positive or negative, for example: $+Ga^i_N$ or $-Ga^i_N$. For example, row 402 of table 400 indicates that for 1 stream, that for N=32, the guard interval can be $Ga^1_{32}$, for N=64, the guard interval can be $-Ga^1_{64}$, for N=128, the guard interval can be $Ga^1_{128}$, for N=256, the guard interval can be $Ga^1_{256}$, and for N=512, the guard interval can be $Ga^1_{512}$.

In various embodiments, the disclosed GSSs can include a number of Golay complementary pairs (for example, Ga and Gb). In one embodiment, the disclosed Golay complementary pairs can meet various predetermined rules and can be used to define enhanced directional multi-gigabit (EDMG) STF and CEF fields for multiple-input and multiple-output (MIMO) transmission.

In various embodiments, a GSS generation system may produce complementary sequences of an arbitrary length. In one embodiment, a GSS for a sequence can be defined in terms of delay vector and/or a weight vector. Further, in another embodiment, the delay vector and/or a weight vector can be described in accordance with one or more standards, for example, in accordance with IEEE 802.11ad standards. The Ga and Gb sequences can be generated using these vectors, for example, by using Golay generator structures. Furthermore, the delay vector and the weight vector can be based at least in part on the (Ga, Gb) complementary pair.

In one embodiment, the guard interval can be defined as a $Ga_{64}$ Golay sequence of length 64 symbols for single input and single Output (SISO) transmission, while further extending the Golay sequences to cover both the channel bonding and MIMO transmission. For MIMO transmission, more than one Golay sequence $Ga_N$ of length N may be needed, that is, a set of Golay sequences, $Ga^i_N$, i=1:$N_{STS}$, may be needed, where $N_{STS}$ can define the total number of space-time streams.

In various embodiments, the disclosure describes the design of guard interval sequence for 3 types of guard intervals having lengths that can be classified as short, medium, and long. In another embodiment, the disclosure defines the guard interval for single channel transmission channel bonding (for example, channel bonding×2, and channel bonding×4), and for MIMO transmission. In one embodiment, the disclosure can be used in connection with single carrier (SC) PHY for use in connection with one or more standards, for example, in connection with IEEE 802.11ay. In another embodiment, the disclosed systems and methods can be used in connection with directional antennas, for example, phase antenna arrays (PAAs).

As mentioned, in various embodiments, the disclosure describes the design of guard interval sequence for 3 types of guard intervals having lengths that can be classified as short, medium, and long. In another embodiment, the short guard interval can be used for short range applications, for example, when the channel impulse of a communication channel response associated with the network has a short duration, such as indoor environments. In one embodiment, the short guard interval can reduce overhead associated with the transmission of the guard interval and can increase the resulting data rate. In one embodiment, the long guard interval can be used in connection with application in large scale environments, for example, applications where a communications channel profile associated with the network has a long time delay spread, such as outdoor environments. In various embodiments, the long guard interval can allow for the reduction of inter symbol interference (ISI) on the network and/or communication channel(s).

In one embodiment, for single channel transmission, the following guard interval lengths can be used: short: N=32 symbols; normal: N=64 symbols; and long: N=128 symbols.

Figure 5:
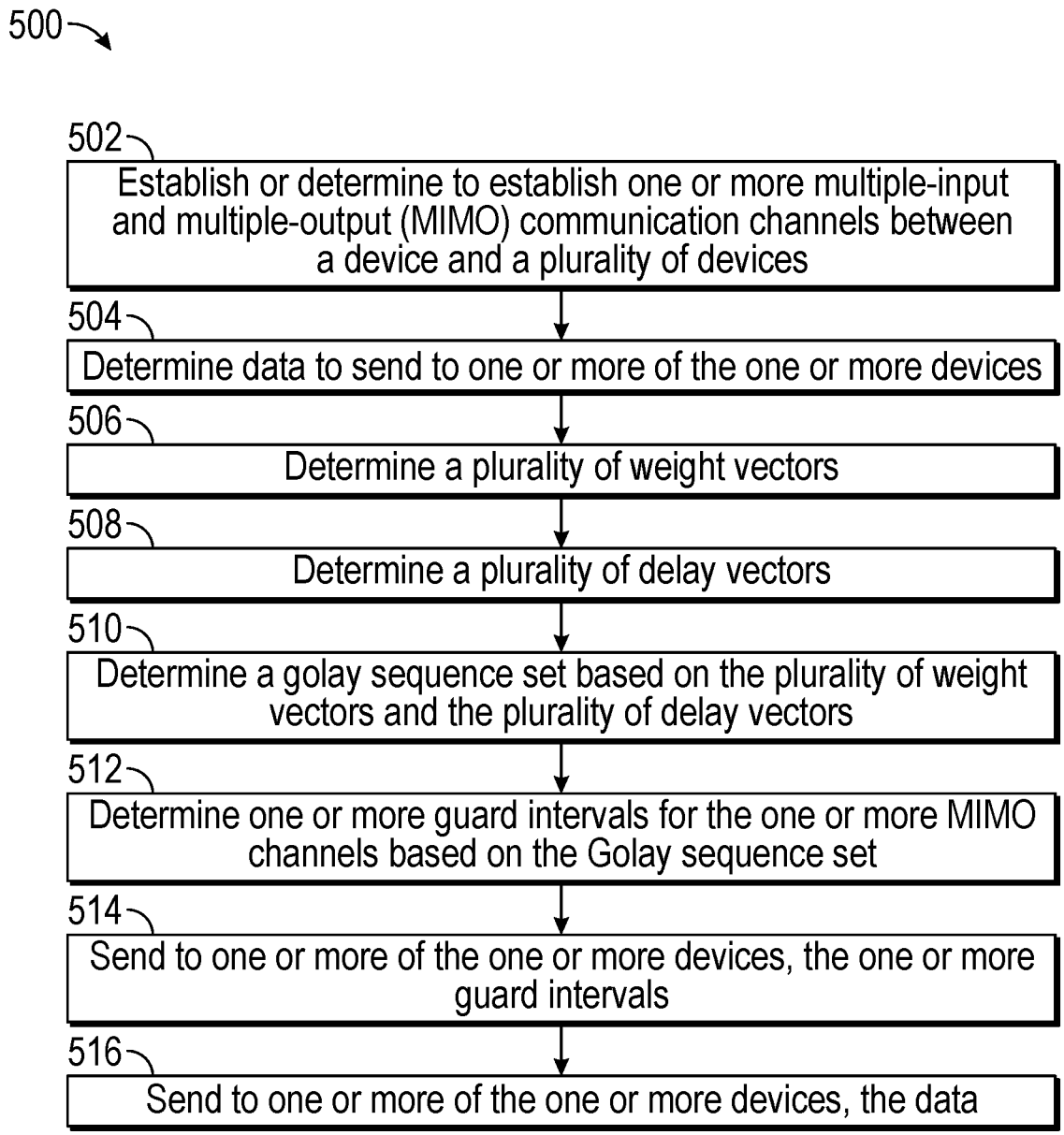
FIG. 5 shows a diagram of an example flow chart in accordance with one or more example embodiments of the disclosure.

FIG. 5 illustrates a flow diagram of illustrative process 500 for an illustrative process for the generation and the use of the guard intervals, in accordance with one or more example embodiments of the present disclosure. In one embodiment, the illustrative process 500 can be used in connection with a transmitting device.

At block 502, a device (e.g., the user device(s) 120 and/or the AP 102 of FIG. 1) may establish or determine to establish one or more multiple-input and multiple-output (MIMO) communication channels between a device and a plurality of devices. The establishment of the MIMO communications channels may first involve a determination of data by the device to send to one or more devices of the plurality of devices.

At block 504, the device can determine data to send to one or more of the one or more devices. This determination of the data to send may be made, for example, based on a user input to the device, a predetermined schedule of data transmissions on the network, changes in network conditions, and the like. The establishment of the MIMO communications channels may further involve the transmission of one or more data packets (for example, one or more Request to Send (RTS)) to notify the one or more devices of the plurality of devices to establish the communications channel. The establishment of the MIMO communications channels may be performed in accordance with one or more wireless and/or network standards.

At block 506, the device can determine a plurality of weight vectors. In various embodiments, a GSS generation system may produce complementary sequences of an arbitrary length. In one embodiment, a GSS for a sequence can be defined in terms of delay vector and/or a weight vector. Further, in another embodiment, the delay vector and/or a weight vector can be described in accordance with IEEE 802.11ad standards. The Ga and Gb sequences can be generated using these vectors, for example, by using Golay generator structures. Furthermore, the delay vector and the weight vector can be based at least in part on the (Ga, Gb) complementary pair. In one embodiment, the weight vectors can be defined as shown and described in connection with FIG. 3 and relevant description. In particular, FIG. 3 shows an example table 300 that represents $W_k$ vector value to generate Golay sequences of different lengths for Multiple-input and multiple-output (MIMO) applications, in accordance with example embodiments of the disclosure. The table of FIG. 3 defines the weight vectors for different space-time streams up to 16 streams. In one embodiment, any subset of the weight vectors shown in the table of FIG. 3 can be used to set up a smaller number of streams.

At block 508, the device can determine a plurality of delay vectors. In various embodiments, a GSS generation system may produce complementary sequences of an arbitrary length. In one embodiment, a GSS for a sequence can be defined in terms of delay vector and/or a weight vector. Further, in another embodiment, the delay vector and/or a weight vector can be described in accordance with IEEE 802.11ad standards. The Ga and Gb sequences can be generated using these vectors, for example, by using Golay generator structures. Furthermore, the delay vector and the weight vector can be based at least in part on the (Ga, Gb) complementary pair. In various embodiments, guard intervals can be defined using the following example delay vectors: for N=32: $D_k$=[1,8,2,4,16]; for N=64: $D_k$=[1,8,2,4,16,32]; for N=128: $D_k$=[1,8,2,4,16,32,64]; for N=256: $D_k$=[1,8,2,4,16,32,64,128]; and for N=512: $D_k$=[1,8,2,4,16,32,64,128,256].

In one embodiment, the delay vector $D_k$ may be different for different length N and may be constant over the space-time streams. In another embodiment, the Golay sequences for different space-time streams may differ in the weight vectors $W_k$.

At block 510, the device can determine a Golay sequence set based on the plurality of weight vectors and the plurality of delay vectors. In one embodiment, the guard interval for the space-time streams can be defined as Ga Golay sequences. In various embodiments, for MIMO transmission, a Golay sequence set (GSS) may be required to define different sequences for different space-time streams. In one embodiment, a $Ga_N$ Golay sequence of length N can be modulated applying n/2 rotation by as follows:

$$Ga_N(n)*\exp(j(\pi/2)*n), \text{ for } n=0:N-1 \qquad \text{(eq. 1)}$$

At block 512, the device can determine one or more guard intervals for the one or more MIMO channels based on the Golay sequence set. In one embodiment, the determination of the guard intervals can be based on the Golay sequence set, which can be further based on the plurality of weight vectors and the plurality of delay vectors. In one embodiment, the guard intervals can be determined as shown and described in connection with FIG. 4 for different spatial stream numbers. In particular, FIG. 4 shows an example table 400 that represents guard intervals $GI^i_N$ for different streams numbers i=1:16 and length N, in accordance with example embodiments of the disclosure. In particular, the table of FIG. 4 defines the Guard Interval (GI) $GI^i_N$ for space-time stream with index "i" and length N. In one embodiment, the $GI^i_N$ can further have a sign, that is positive or negative, for example: $+Ga^i_N$ or $-Ga^i_N$.

In one embodiment, the guard interval can have 3 types having lengths that can be classified as short, medium, and long. In another embodiment, the guard intervals can be defined for single channel transmission channel bonding (for example, channel bonding×2, and channel bonding×4), and for MIMO transmission. In one embodiment, the disclosure can be used in connection with single carrier (SC) PHY for use in connection with one or more standards, for example, in connection with IEEE 802.11ay. In another embodiment, the disclosed systems and methods can be used in connection with directional antennas, for example, phase antenna arrays (PAAs). In one embodiment, for single channel transmission, the following guard interval lengths can be used: short: N=32 symbols; normal: N=64 symbols; and long: N=128 symbols.

At block 514, the device can send to one or more of the one or more devices, the one or more guard intervals. In one embodiment, the one or more guard intervals may be encapsulated in a data frame that is sent from the device to one or more of the plurality of devices. In one embodiment, the guard intervals may be sent at a predetermined time based at least in part on a predetermined schedule of communication between the devices of the network. In another embodiment, a first guard interval may be first sent by the device, a period of time may elapse, and the device may repeat some or all of the procedures described in connection with any one or more of the previous blocks, and resend second guard intervals. In one embodiment during, or after the transmission of the guard intervals, the device may receive information from the receiving device, indicative of a change to be performed by the transmitting device in sending data and/or guard intervals. For example, the information may indicate to change the number of streams of the MIMO communications channels, to increase and/or decrease the amount of data transmitted on one or more channels of the MIMO communications channels, to retransmit one or more packets of data, to send one or more packets of data at a predetermined time, and the like.

At block 516, the device can send to one or more of the one or more devices, the data. In one embodiment, the data may be encapsulated in a data frame that is sent from the device to one or more of the plurality of devices. In one embodiment, the data may be sent at a predetermined time based at least in part on a predetermined schedule of communication between the devices of the network. In another embodiment, a first data may be first sent by the device, a period of time may elapse, and the device may repeat some or all of the procedures described in connection with any one or more of the previous blocks, and resend second data. In one embodiment during, or after the transmission of the data, the device may receive information from the receiving device, indicative of a change to be performed by the transmitting device in sending data and/or guard intervals. For example, the information may indicate to change the number of streams of the MIMO communications channels, to increase and/or decrease the amount of data transmitted on one or more channels of the MIMO communications channels, to retransmit one or more packets of data, to send one or more packets of data at a predetermined time, and the like.

Figure 6:
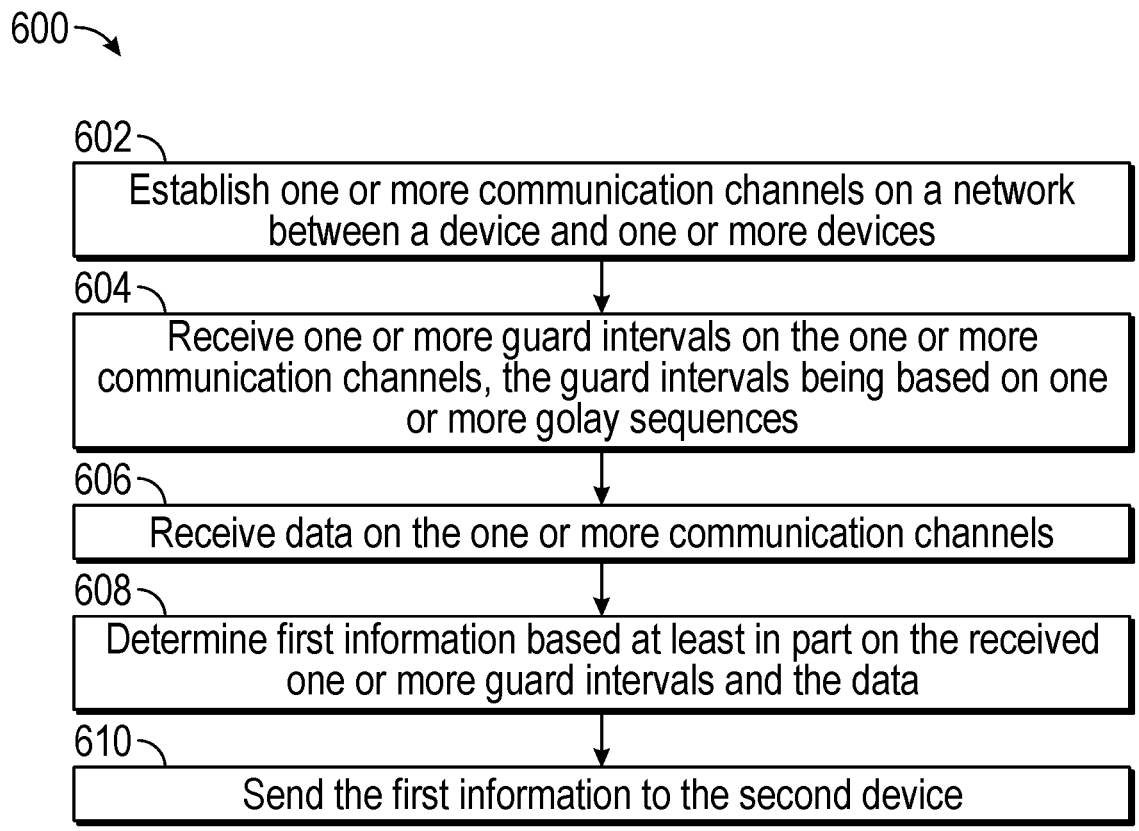
FIG. 6 shows a diagram of another example flow chart in accordance with one or more example embodiments of the disclosure.

FIG. 6 illustrates a flow diagram of illustrative process 600 for an illustrative process for the generation and the use of the guard intervals, in accordance with one or more example embodiments of the present disclosure. In one embodiment, the illustrative process 600 can be used in connection with a receiving device.

In block 602, one or more communication channels on a network can be established between a device and one or more devices. The establishment of the MIMO communications channels may first involve a determination of data by the device to send to the second device. This determination of the data to send may be made, for example, based on a user input to the device or the second device, a predetermined schedule of data transmissions on the network, changes in network conditions, and the like. The establishment of the MIMO communications channels may further involve the transmission of one or more data packets (for example, one or more Clear to Send (CTS)) to notify the second device of one or more conditions related to the establishment of the communications channels. The establishment of the MIMO communications channels may be performed in accordance with one or more wireless and/or network standards.

In block 604, one or more guard intervals can be received on the one or more communication channels, the guard intervals being based on one or more Golay sequences.

In one embodiment, the one or more guard intervals may be encapsulated in a data frame that is sent from the device to one or more of the plurality of devices. In one embodiment, the guard intervals may be sent at a predetermined time based at least in part on a predetermined schedule of communication between the devices of the network. In another embodiment, a first guard interval may be first sent by the device, a period of time may elapse, and the device may repeat some or all of the procedures described in connection with any one or more of the previous blocks, and resend second guard intervals. In one embodiment during, or after the transmission of the guard intervals, the device may receive information from the receiving device, indicative of a change to be performed by the transmitting device in sending data and/or guard intervals. For example, the information may indicate to change the number of streams of the MIMO communications channels, to increase and/or decrease the amount of data transmitted on one or more channels of the MIMO communications channels, to retransmit one or more packets of data, to send one or more packets of data at a predetermined time, and the like.

In one embodiment, the guard interval for the space-time streams can be defined as Ga Golay sequences. In various embodiments, for MIMO transmission, a Golay sequence set (GSS) may be required to define different sequences for different space-time streams. In one embodiment, a $Ga_N$ Golay sequence of length N can be modulated applying $\pi/2$ rotation by as follows:

$$Ga_N(n)*\exp(j(\pi/2)*n), \text{ for } n=0:N-1 \quad \text{(eq. 1)}$$

In one embodiment, the guard intervals can be based on the Golay sequence set, which can be further based on a plurality of weight vectors and a plurality of delay vectors. In one embodiment, the guard intervals can be determined as shown and described in connection with FIG. 4 for different spatial stream numbers. In particular, FIG. 4 shows an example table 400 that represents guard intervals $GI^i_N$ for different streams numbers i=1:16 and length N, in accordance with example embodiments of the disclosure. In particular, the table of FIG. 4 defines the Guard Interval (GI) $GI^i_N$ for space-time stream with index "i" and length N. In one embodiment, the $GI^i_N$ can further have a sign, that is positive or negative, for example: $+Ga^i_N$ or $-Ga^i_N$.

In block 606, data can be received on the one or more communication channels. In one embodiment, the data may be encapsulated in a data frame that is s received by a receiving device. In one embodiment, the data may be sent at a predetermined time based at least in part on a predetermined schedule of communication between the devices of the network. In one embodiment during, or after the receiving of the data, the device may determine information indicative of a change to be performed by the transmitting device in sending data and/or guard intervals. For example, the information may indicate to change the number of streams of the MIMO communications channels, to increase and/or decrease the amount of data transmitted on one or more channels of the MIMO communications channels, to retransmit one or more packets of data, to send one or more packets of data at a predetermined time, and the like.

In block 608, first information can be determined based at least in part on the received one or more guard intervals and the data. In one embodiment during, or after the reception of the guard intervals or data, the device may determine the first information, the information indicative of a change to be performed by the transmitting device in sending data. For example, the first information may indicate to the second device to change the number of streams of the MIMO communications channels, to increase and/or decrease the amount of data transmitted on one or more channels of the MIMO communications channels, to retransmit one or more packets of data, to send one or more packets of data at a predetermined time, and the like.

In block 610, the first information can be sent to the second device. For example, the first information may indicate to the second device to change the number of streams of the MIMO communications channels, to increase and/or decrease the amount of data transmitted on one or more channels of the MIMO communications channels, to retransmit one or more packets of data, to send one or more packets of data at a predetermined time, and the like.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Figure 7:
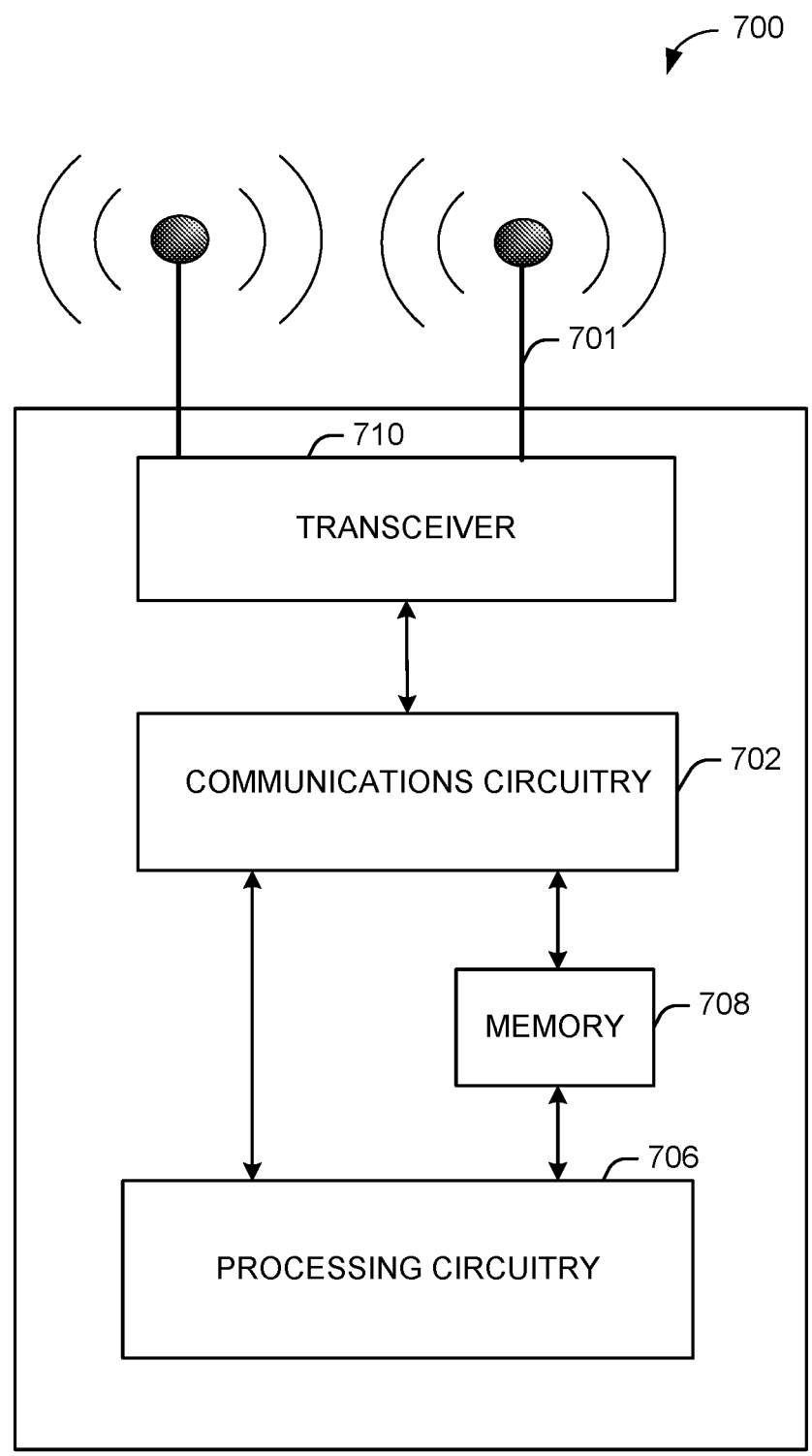
FIG. 7 illustrates a functional diagram of an example communication station that may be suitable for use as a user device, in accordance with one or more example embodiments of the disclosure.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or communication station user device 120 (FIG. 1) in accordance with some embodiments. The communication station 700 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 1-4.

The communication station 700 may include communications circuitry 702 and a transceiver 710 for transmitting and receiving signals to and from other communication stations using one or more antennas 701. The transceiver 710 may be a device comprising both a transmitter and a receiver that are combined and share common circuitry (e.g., communication circuitry 702). The communication circuitry 702 may include amplifiers, filters, mixers, analog to digital and/or digital to analog converters. The transceiver 710 may transmit and receive analog or digital signals. The transceiver 710 may allow reception of signals during transmission periods. This mode is known as full-duplex, and may require the transmitter and receiver to operate on different frequencies to minimize interference between the transmitted signal and the received signal. The transceiver 710 may operate in a half-duplex mode, where the transceiver 710 may transmit or receive signals in one direction at a time.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device may, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

Figure 8:
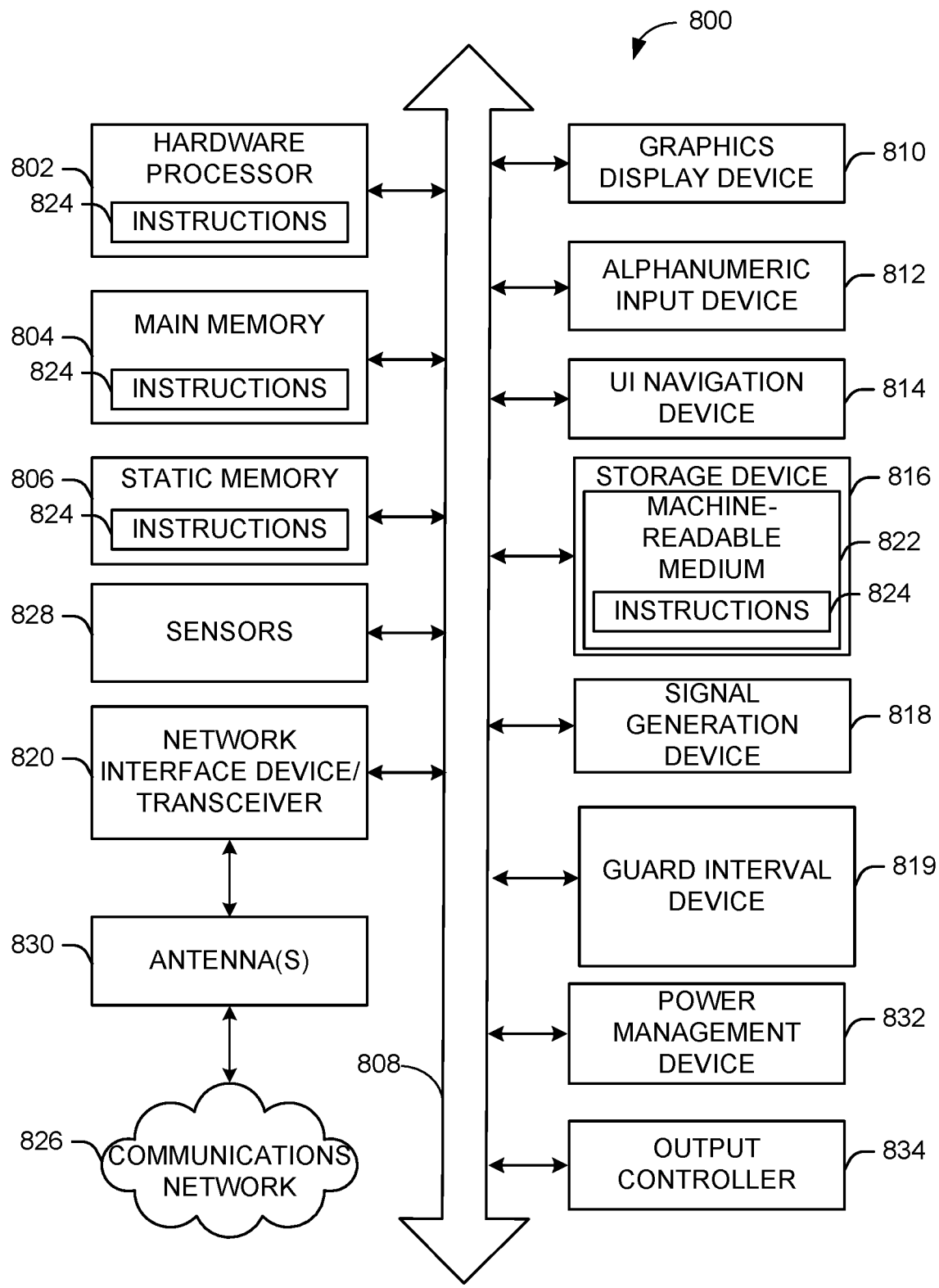
FIG. 8 shows a block diagram of an example machine upon which any of one or more techniques (e.g., methods) may be performed, in accordance with one or more embodiments of the disclosure.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a Guard Interval Device 819, a network interface device/transceiver 820 coupled to antenna(s) 830, and one or more sensors 828, such as a global positioning system (GPS) sensor, compass, accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The Guard Interval Device 819 may be configured to cause to establish, by the device, one or more multiple-input and multiple-output (MIMO) communication channels on a network, between the device and a plurality of devices; determine, by the device, one or more guard intervals for the one or more MIMO channels; and cause to send, by the device, to one or more of the plurality of devices, the guard intervals. It is understood that the above are only a subset of what the Guard Interval Device 819 may be configured to perform and that other functions included throughout this disclosure may also be performed by the Guard Interval Device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Examples 1 is a device, comprising: at least one memory that stores computer-executable instructions; and at least one processor of the one or more processors configured to access the at least one memory, wherein the at least one processor of the one or more processors is configured to execute the computer-executable instructions to: cause to establish, by the device, one or more communication channels between the device and a second device; determine data to send, by the device, to the second device; determine, by the device, one or more Golay sequences; determine, by the device, one or more guard intervals on the one or more communication channels based on the one or more Golay sequences; cause to send, by the device, to the second device, the guard intervals; and cause to send, by the device, to the second device, the data. In example 2, the devices of example 1 can optionally the one or more communication channels further comprising single carrier modulation with channel bonding. In example 3, the device of any one of examples 1-2 can optionally include a first guard interval of the one or more guard intervals having a length based at least in part on a channel bonding factor. In example 4, the device of any one of examples 1-3 can optionally include a first guard interval of the one or more guard intervals having a length that is one of 32 symbols, 64 symbols, or 128 symbols. In example 5, the device of any one of examples 1-4 a first Golay sequence of the one or more Golay sequences being based at least in part on one or more weight vectors. In example 6, the device of any one of examples 1-5 can optionally include a first guard interval of the one or more guard intervals being based at least in part on one or more delay vectors. In example 7, the device of any one of examples 1-6 can optionally include a delay vector of the one or more delay vectors is based at least in part on a length of the one or more guard intervals. In example 8, the device of any one of examples 1-7 can optionally include the one or more communication channels comprising a multiple-input and multiple-output (MIMO) communication channel. In example 9, the device of any one of examples 1-8 can optionally include the one or more communication channel comprising the MIMO communication channel, and further comprising a (i) single user (SU) MIMO transmission, or (ii) a multi-user (MU) MIMO transmission. In example 10, the device of any one of examples 1-9 can optionally include a transceiver configured to transmit and receive wireless signals and an antenna coupled to the transceiver.

Example 11 is a computer-readable medium storing computer-executable instructions which, when executed by a processor, cause the processor to perform operations comprising: determine data to send, by the processor, to a second device; cause to establish, by the processor, one or more communication channels on a network, between the device and the second device; determine, by the processor, one or more Golay sequences; determine, by the processor, one or more guard intervals on the one or more communication channels based on the one or more Golay sequences; cause to send, by the processor, to a second device, the guard intervals; and cause to send, by the processor, to the second device, the data. In example 12, the computer-readable medium of example 11 can optionally include the one or more communication channels further comprising single carrier modulation with channel bonding. In example 13, the computer-readable medium of any one of examples 11-12 can optionally include a first guard interval of the one or more guard intervals has a length based at least in part on a channel bonding factor. In example 14, the computer-readable medium of any one of examples 11-13 can optionally include a first guard interval of the one or more guard intervals having a length that is one of 32 symbols, 64 symbols, or 128 symbols. In example 15, the computer-readable medium of any one of examples 11-14 can optionally include the one or more communication channels comprising a multiple-input and multiple-output (MIMO) communication channel. In example 16, the computer-readable medium of any one of examples 11-15 can optionally include the one or more communication channels comprising the MIMO communication channel, and further comprising a (i) single user (SU) MIMO transmission, or (ii) a multi-user (MU) MIMO transmission. In example 17, the computer-readable medium of any one of examples 11-16 can optionally include a first Golay sequence of the one or more Golay sequences being based at least in part on one or more weight vectors. In example 18, the computer-readable medium of any one of examples 11-17 can optionally include a first guard interval of the one or more guard intervals being based at least in part on one or more delay vectors. In example 19, the computer-readable medium of any one of examples 11-18 can optionally include a delay vector of the one or more delay vectors being based at least in part on a length of the one or more guard intervals.

Example 20 is a method, comprising: establishing one or more communication channels on a network, between a device and a second device; receiving one or more guard intervals on the one or more communication channels, the guard intervals being based on one or more Golay sequences; receiving data on the one or more communication channels; determining first information based at least in part on the received one or more guard intervals and the data; and sending, to the second device, the first information. In example 21, the method of example 20 can optionally include the one or more communication channels further comprise single carrier modulation with channel bonding. In example 22, the method of any one of examples 20-21 can optionally include the one or more communication channels comprising a multiple-input and multiple-output (MIMO) communication channel. In example 23, the method of any one of examples 20-22 can optionally include the one or more communication channels comprises a MIMO communication channel, and further comprises a (i) single user (SU) MIMO transmission, or (ii) a multi-user (MU) MIMO transmission.

Example 24 is a device, comprising at least one memory that stores computer-executable instructions; and at least one processor of the one or more processors configured to access the at least one memory, wherein the at least one processor of the one or more processors is configured to execute the computer-executable instructions to: establish one or more communication channels on a network, between a device and a second device; receive one or more guard intervals on the one or more communication channels, the guard intervals being based on one or more Golay sequences; receive data on the one or more communication channels; determine first information based at least in part on the received one or more guard intervals and the data; and send, to the second device, the first information. In example 25, the device of example 24 can optionally include the one or more communication channels further comprising single carrier modulation with channel bonding. In example 26, the device of any one of examples 24-25 can optionally include the one or more communication channels comprising a multiple-input and multiple-output (MIMO) communication channel. In example 27, the device of any one of examples 24-26 can optionally include the one or more communication channels comprising a MIMO communication channel, and further comprising a (i) single user (SU) MIMO transmission, or (ii) a multi-user (MU) MIMO transmission.

Example 28 is a non-transitory computer-readable medium storing computer-executable instructions which, when executed by a processor, cause the processor to perform operations comprising: establish one or more communication channels on a network, between a device and a second device; receive one or more guard intervals on the one or more communication channels, the guard intervals being based on one or more Golay sequences; receive data on the one or more communication channels; determine first information based at least in part on the received one or more guard intervals and the data; and send, to the second device, the first information. In example 29, the computer-readable medium of example 28 can optionally include the one or more communication channels further comprising single carrier modulation with channel bonding. In example 30, computer-readable medium of any one of examples 28-29 can optionally include the one or more communication channels comprising a multiple-input and multiple-output (MIMO) communication channel. In example 31, the computer-readable medium of any one of examples 28-30 can optionally include the one or more communication channels comprising a MIMO communication channel, and further comprising a (i) single user (SU) MIMO transmission, or (ii) a multi-user (MU) MIMO transmission.

Example 32 is an apparatus, comprising: means for establishing one or more communication channels on a network, between a device and a second device; means for receiving one or more guard intervals on the one or more communication channels, the guard intervals being based on one or more Golay sequences; means for receiving data on the one or more communication channels; means for determining first information based at least in part on the received one or more guard intervals and the data; and means for sending, to the second device, the first information. In example 33, the apparatus of example 32 can optionally include a first Golay sequence of the one or more Golay sequences is based at least in part on one or more weight vectors. In example 34, the apparatus of any one of examples 32-33 can optionally include a first guard interval of the one or more guard intervals being based at least in part on one or more delay vectors. In example 35, the computer-readable medium of any one of examples 32-34, wherein a delay vector of the one or more delay vectors is based at least in part on a length of the one or more guard intervals.

Example 36 is a method, comprising: causing to establish, by the device, one or more communication channels between the device and a second device; determining data to send, by the device, to the second device; determining, by the device, one or more Golay sequences; determining, by the device, one or more guard intervals on the one or more communication channels based on the one or more Golay sequences; causing to send, by the device, to the second device, the guard intervals; and causing to send, by the device, to the second device, the data. In example 37, the method of example 36 can optionally include the one or more communication channels further comprising single carrier modulation with channel bonding. In example 38, the method of any one of examples 36-37 can optionally include a first guard interval of the one or more guard intervals having a length based at least in part on a channel bonding factor. In example 39, the method of any one of examples 36-38 can optionally include a first guard interval of the one or more guard intervals having a length that is one of 32 symbols, 64 symbols, or 128 symbols. In example 40, the method of any one of examples 36-39 can optionally include a first Golay sequence of the one or more Golay sequences being based at least in part on one or more weight vectors. In example 41, the method of any one of examples 36-40 can optionally include a first guard interval of the one or more guard intervals being based at least in part on one or more delay vectors. In example 42, the method of any one of examples 36-41 can optionally include a delay vector of the one or more delay vectors being based at least in part on a length of the one or more guard intervals. In example 43, the method of any one of examples 36-42 can optionally include the one or more communication channels comprising a multiple-input and multiple-output (MIMO) communication channel. In example 44, the method of any one of examples 36-43 can optionally include the one or more communication channel comprising the MIMO communication channel, and further comprising a (i) single user (SU) MIMO transmission, or (ii) a multi-user (MU) MIMO transmission.

Example 45 is an apparatus, comprising: means for causing to establish, by the device, one or more communication channels between the device and a second device; means for determining data to send, by the device, to the second device; means for determining, by the device, one or more Golay sequences; means for determining, by the device, one or more guard intervals on the one or more communication channels based on the one or more Golay sequences; means for causing to send, by the device, to the second device, the guard intervals; and means for causing to send, by the device, to the second device, the data. In example 46, the apparatus of example 45 can optionally include the one or more communication channels further comprising single carrier modulation with channel bonding. In example 47, the apparatus of any one of examples 45-46 can optionally include a first guard interval of the one or more guard intervals having a length based at least in part on a channel bonding factor. In example 48, the apparatus of any one of examples 45-47 can optionally include a first guard interval of the one or more guard intervals having a length that is one of 32 symbols, 64 symbols, or 128 symbols. In example 49, the apparatus of any one of examples 45-48 can optionally include a first Golay sequence of the one or more Golay sequences is based at least in part on one or more weight vectors. In example 50, the apparatus of any one of examples 45-49 can optionally include a first guard interval of the one or more guard intervals being based at least in part on one or more delay vectors. In example 51, the apparatus of any one of examples 45-50 can optionally include a delay vector of the one or more delay vectors being based at least in part on a length of the one or more guard intervals. In example 52, the apparatus of any one of examples 45-51 can optionally include the one or more communication channels comprising a multiple-input and multiple-output (MIMO) communication channel. In example 53, the apparatus of any one of examples 45-52 can optionally include the one or more communication channel comprising the MIMO communication channel, and further comprising a (i) single user (SU) MIMO transmission, or (ii) a multi-user (MU) MIMO transmission.

In one embodiment, the weight vector comprises a weigh vector for a sequence length of 32 and has a value of [−1, −1, −1, −1, +1] for 1 stream, [+1,−1,−1,−1,+1] for 2 streams, [4,−1,−1,+1,−1] for 3 streams, [+1,−1,−1,+1,−1] for 4 streams, [−1,−1,−1,+1,−1] for 5 streams, [+1,−1,−1,+1,−1] for 6 streams, [−1,−1,−1,+1,+1] for 7 streams, [+1,−1,−1,+1,+1] for 8 streams, [−1,−1,+1,−1,−1] for 9 streams, [+1,−1,+1,−1,−1] for 10 streams, [−1,−1,+1,−1,+1] for 11 streams, [+1,−1,+1,−1,+1] for 12 streams, [−1,−1,+1,−1,+1] for 13 streams, [+1,−1,+1,−1,+1] for 14 streams, [−1,−1,+1,+1,−1] for 15 streams, [+1,−1,+1,+1,−1] for 16 streams.

In one embodiment, the weight vector comprises a weigh vector for a sequence length of 64 and has a value of [−1, −1, −1, +1,−1] for 1 stream, [+1,−1,−1,−1,+1,−1] for 2 streams, [4,−1,−1,+1,−1,−1] for 3 streams, [+1,−1,−1,+1,−1,−1] for 4 streams, [−1,−1,−1,+1,−1,+1] for 5 streams, [+1,−1,−1,+1,−1,+1] for 6 streams, [−1,−1,−1,+1,+1,+1] for 7 streams, [+1,−1,−1,+1,+1,+1] for 8 streams, [−1,−1,+1,−1,−1,+1] for 9 streams, [+1,−1,+1,−1,−1,+1] for 10 streams, [−1,−1,+1,−1,+1,−1] for 11 streams, [+1,−1,+1,−1,+1,−1] for 12 streams, [−1,−1,+1,−1,+1,+1] for 13 streams, [+1,−1,+1,−1,+1,+1] for 14 streams, [−1,−1,+1,+1,−1,+1] for 15 streams, [+1,−1,+1,+1,−1,+1] for 16 streams.

In one embodiment, the weight vector comprises a weigh vector for a sequence length of 128 and has a value of [−1,−1,−1,−1,+1,−1,−1] for 1 stream, [+1,−1,−1,−1,+1,−1,−1] for 2 streams, [−1,−1,−1,+1,−1,−1,+1] for 3 streams, [+1,−1,−1,+1,−1,−1,+1] for 4 streams, [−1,−1,−1,+1,−1,+1,+1] for 5 streams, [+1,−1,−1,+1,−1,+1,+1] for 6 streams, [−1,−1,−1,+1,+1,+1−1] for 7 streams, [+1,−1,−1,+1,+1,+1−1] for 8 streams, [−1,−1,+1,−1,−1,+1,−1] for 9 streams, [+1,−1,+1,−1,−1,+1,−1] for 10 streams, [−1,−1,+1,−1,+1,−1,+1] for 11 streams, [+1,−1,+1,−1,+1,−1,+1] for 12 streams, [−1,−1,+1,+1,+1,+1 for 13 streams, [+1,−1,+1,−1,+1,+1 for 14 streams, [−1,−1,+1,+1−1,+1,−1] for 15 streams, [+1,−1,+1,+1−1,+1,−1] for 16 streams.

In one embodiment, the weight vector comprises a weigh vector for a sequence length of 256 and has a value of [−1,−1,−1,−1,+1,−1,−1,+1] for 1 stream, [+1,−1,−1,−1,+1,−1,−1,+1] for 2 streams, [−1,−1,−1,+1,−1,−1,+1,−1] for 3 streams, [+1,−1,−1,+1,−1,−1,+1,−1] for 4 streams, [−1,−1,−1,+1,+1,−1,+1−1] for 5 streams, [+1,−1,−1,+1,−1,+1,+1−1] for 6 streams, [−1,−1,−1,+1,+1,+1−1,−1] for 7 streams, [+1,−1,−1,+1,+1,+1−1,−1] for 8 streams, [−1,−1,+1,−1,−1,+1,−1,+ 1,−1,−1] for 9 streams, [+1,−1,+1,−1,−1,+1,−1,−1] for 10 streams, [−1,−1,+1,−1,+1,−1,+1,−1] for 11 streams, [+1,−1,+1,−1,+1,−1,+1,−1] for 12 streams, [−1,−1,+1,−1,+1,−1,+1,+1−1] for 13 streams, [+1,−1,+1,−1,+1,+1,+1−1] for 14 streams, [−1,−1,+1,+1−1,+1,−1,−1] for 15 streams, [+1,−1,+ 1,+1−1,+1,−1,−1] for 16 streams.

In one embodiment, the weight vector comprises a weigh vector for a sequence length of 512 and has a value of [−1,−1,−1,+1,−1,−1,+1,+1] for 1 stream, [+1,−1,−1,+1,−1, 1,−1,+1,+1] for 2 streams, [−1,−1, −1,+1,−1,−1,+1,−1,+ 1] for 3 streams, [+1,−1, −1,+1,−1,−1,+1,−1,+1] for 4 streams, [−1,−1,−1,+1,−1,+1,+1−1,+1] for 5 streams, [+1,− 1,−1,+1,−1,+1,+1−1,+1] for 6 streams, [−1,−1,−1,+1,+1,+1− 1,−1,+1] for 7 streams, [+1,−1,−1,+1,+1,+1−1,−1,+1] for 8 streams, [−1,−1,+1,−1,−1,+1,−1,−1,+1] for 9 streams, [+1,− 1,+1,−1,−1,+1,−1,−1,+1] for 10 streams, [−1,−1,+1,−1,+1,− 1,+1,−1,+1] for 11 streams, [+1,−1,+1,−1,+1,−1,+1,−1,+1] for 12 streams, [−1,−1,+1,−1,+1,+1] for 13 streams, [+1,−1,+ 1,−1,+1,+1−1,+1] for 14 streams, [−1,−1,+1,+1−1,+1,−, 1,−1,+1] for 15 streams, [+1,−1,+1,+1−1,+1,−1,−1,+1] for 16 streams.

In one embodiment, the guard interval for a sequence length of 32 has a value of $Ga^1_{32}$ for 1 stream, $Ga^2_{32}$ for 2 streams, $Ga^3_{32}$ for 3 streams, $Ga^4_{32}$ for 4 streams, $-Ga^5_{32}$ for 5 streams, $-Ga^6_{32}$ for 6 steams, $Ga^7_{32}$ for 7 steams, $Ga^8_{32}$ for 8 steams, $Ga^9_{32}$ for 9 steams, $Ga^{10}_{32}$ for 10 steams, $Ga^{11}_{32}$ for 11 steams, $Ga^{12}_{32}$ for 12 steams, $-Ga^{13}_{32}$ for 13 steams, $-Ga^{14}_{32}$ for 14 steams, $Ga^{15}_{32}$ for 15 steams, $Ga^{16}_{32}$ for 16 steams.

In one embodiment, the guard interval for a sequence length of 64 has a value of $-Ga^1_{64}$ for 1 stream, $-Ga^2_{64}$ for 2 streams, $-Ga^3_{64}$ for 3 steams, $-Ga^4_{64}$ for 4 steams, $-Ga^5_{64}$ for 5 steams, $-Ga^6_{64}$ for 6 steams, $Ga^7_{64}$ for 7 steams, $Ga^8_{64}$ for 8 steams, $Ga^9_{64}$ for 9 steams, $Ga^{10}_{64}$ for 10 steams, $-Ga^{11}_{64}$ for 11 steams, $-Ga^{12}_{64}$ for 12 steams, $-Ga^{13}_{64}$ for 13 steams, $-Ga^{14}_{64}$ for 14 steams, $Ga^{15}_{64}$ for 15 steams, $Ga^{16}_{64}$ for 16 steams.

In one embodiment, the guard interval for a sequence length of 128 has a value of $Ga^1_{128}$ for 1 stream, $Ga^2_{128}$ for 2 streams, $-Ga^3_{128}$ for 3 streams, $-Ga^4_{128}$ for 4 streams, $-Ga^5_{128}$ for 5 streams, $-Ga^6_{128}$ for 6 streams, $-Ga^7_{128}$ for 7 streams, $-Ga^8_{128}$ for 8 streams, $-Ga^9_{128}$ for 9 streams, $-Ga^{10}_{128}$ for 10 streams, $-Ga^{11}_{128}$ for 11 streams, $-Ga^{12}_{128}$ for 12 streams, $-Ga^{13}_{128}$ for 13 streams, $-Ga^{14}_{128}$ for 14 streams, $-Ga^{15}_{128}$ for 15 streams, $-Ga^{16}_{128}$ for 16 streams.

In one embodiment, the guard interval for a sequence length of 256 has a value of $Ga^1_{256}$ for 1 stream, $Ga^2_{256}$ for 2 streams, $Ga^3_{256}$ for 3 streams, $Ga^4_{256}$ for 4 streams, $Ga^5_{256}$ for 5 streams, $Ga^6_{256}$ for 6 streams, $Ga^7_{256}$ for 7 streams, $Ga^8_{256}$ for 8 streams, $Ga^9_{256}$ for 9 streams, $Ga^{10}_{256}$ for 10 streams, $Ga^{11}_{256}$ for 11 streams, $Ga^{12}_{256}$ for 12 streams, $Ga^{13}_{256}$ for 13 streams, $Ga^{14}_{256}$ for 14 streams, $Ga^{15}_{256}$ for 15 streams, $Ga^{16}_{256}$ for 16 streams.

In one embodiment, the guard interval for a sequence length of 512 has a value of $Ga^1_{512}$ for 1 stream, $Ga^2_{512}$ for 2 streams, $Ga^3_{512}$ for 3 streams, $Ga^4_{512}$ for 4 streams, $Ga^5_{512}$ for 5 streams, $Ga^6_{512}$ for 6 streams, $Ga^7_{512}$ for 7 streams, $Ga^8_{512}$ for 8 streams, $Ga^9_{512}$ for 9 streams, $Ga^{10}_{512}$ for 10 streams, $Ga^{11}_{512}$ for 11 streams, $Ga^{12}_{512}$ for 12 streams, $Ga^{13}_{512}$ for 13 streams, $Ga^{14}_{512}$ for 14 streams, $Ga^{15}_{512}$ for 15 streams, $Ga^{16}_{512}$ for 16 streams.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
select one or more communication channels to be used for transmitting a frame to a second device;
determine a channel bonding factor associated with the one or more communication channels;
select a first guard interval of one or more guard intervals to be used on the one or more communication channels, wherein the first guard interval is based on the channel bonding factor;
select one or more spatial streams associated with the first guard interval;
select a first weight factor associated with the one or more spatial streams;
generate a first Golay sequence of one or more Golay sequences associated with the one or more communication channels, wherein the first Golay sequence is based on the weight factor;
associate a first delay vector with the first Golay sequence, wherein the first delay vector is based the length of the first Golay sequence; and
cause to send data to the second device, wherein the data comprises one or more symbols, wherein the one or more symbols are separated the one or more guard intervals.

2. The device of claim 1, wherein the one or more communication channels is based on single carrier modulation.

3. The device of claim 1, wherein the length of the first weight vector is 5 when the length of the first Golay sequence is 32 symbols, and wherein the length of the first weight vector is 6 when the length of the first Golay sequence is 64 symbols, and wherein the length of the first weight vector is 7, when the length of the first Golay sequence is 128 symbols.

4. The device of claim 1, wherein the guard interval is short, normal, or long, wherein when the channel bonding factor is equal to 1, a short guard interval is 32 symbols, a normal guard interval is 64 symbols, and a long guard interval is 128 symbols.

5. The device of claim 1, wherein the guard interval is short, normal, or long, wherein when the channel bonding factor is equal to 2, a short guard interval is 64 symbols, a normal guard interval is 128 symbols, and a long guard interval is 256 symbols.

6. The device of claim 1, wherein the one or more communication channels comprises a multiple-input and multiple-output (MIMO) communication channel.

7. The device of claim 6, wherein the one or more communication channel comprises the MIMO communication channel, and further comprises a single user (SU) MIMO transmission or a multi-user (MU) MIMO transmission.

8. The device of claim 1, further comprising a transceiver configured to transmit and receive wireless signals.

9. The device of claim 8, further comprising an antenna coupled to the transceiver to cause to send the data.

10. A non-transitory computer-readable medium storing computer-executable instructions which when executed by one or more processors result in performing operations comprising:
selecting one or more communication channels to be used for transmitting a frame to a second device;
determining a channel bonding factor associated with the one or more communication channels;
selecting a first guard interval of one or more guard intervals to be used on the one or more communication channels, wherein the first guard interval is based on the channel bonding factor;
selecting one or more spatial streams associated with the first guard interval;
selecting a first weight factor associated with the one or more spatial streams;
generating a first Golay sequence of one or more Golay sequences associated with the one or more communication channels, wherein the first Golay sequence is based on the weight factor;
associating a first delay vector with the first Golay sequence, wherein the first delay vector is based on the length of the first Golay sequence; and
causing to send data to the second device, wherein the data comprises one or more symbols, wherein the one or more symbols are separated the one or more guard intervals.

11. The non-transitory computer-readable medium of claim 10, wherein the one or more communication channels is based on single carrier modulation.

12. The non-transitory computer-readable medium of claim 10, wherein the length of the first weight vector is 5 when the length of the first Golay sequence is 32 symbols, and wherein the length of the first weight vector is 6 when the length of the first Golay sequence is 64 symbols, and wherein the length of the first weight vector is 7, when the length of the first Golay sequence is 128 symbols.

13. The non-transitory computer-readable medium of claim 10, wherein the guard interval is short, normal, or long, wherein when the channel bonding factor is equal to 1, a short guard interval is 32 symbols, a normal guard interval is 64 symbols, and a long guard interval is 128 symbols.

14. The non-transitory computer-readable medium of claim 10, wherein the guard interval is short, normal, or long, wherein when the channel bonding factor is equal to 2, a short guard interval is 64 symbols, a normal guard interval is 128 symbols, and a long guard interval is 256 symbols.

15. The non-transitory computer-readable medium of claim 10, wherein the one or more communication channels comprises a multiple-input and multiple-output (MIMO) communication channel.

16. The non-transitory computer-readable medium of claim 15, wherein the one or more communication channel comprises the MIMO communication channel, and further comprises a single user (SU) MIMO transmission or a multi-user (MU) MIMO transmission.

17. A method comprising:
selecting, by one or more processors, one or more communication channels to be used for transmitting a frame to a second device;
determining a channel bonding factor associated with the one or more communication channels;
selecting a first guard interval of one or more guard intervals to be used on the one or more communication channels, wherein the first guard interval is based on the channel bonding factor;
selecting one or more spatial streams associated with the first guard interval;
selecting a first weight factor associated with the one or more spatial streams;
generating a first Golay sequence of one or more Golay sequences associated with the one or more communication channels, wherein the first Golay sequence is based on the weight factor;

associating a first delay vector with the first Golay sequence, wherein the first delay vector is based on the length of the first Golay sequence; and causing to send data to the second device, wherein the data comprises one or more symbols, wherein the one or more symbols are separated the one or more guard intervals.

18. The method of claim 17, wherein the one or more communication channels is based on single carrier modulation.

19. The method of claim 17, wherein the length of the first weight vector is 5 when the length of the first Golay sequence is 32 symbols, and wherein the length of the first weight vector is 6 when the length of the first Golay sequence is 64 symbols, and wherein the length of the first weight vector is 7, when the length of the first Golay sequence is 128 symbols.

20. The method of claim 17, wherein the guard interval is short, normal, or long, wherein when the channel bonding factor is equal to 1, a short guard interval is 32 symbols, a normal guard interval is 64 symbols, and a long guard interval is 128 symbols.

* * * * *